(12) United States Patent
Rollinger et al.

(10) Patent No.: US 9,222,426 B2
(45) Date of Patent: Dec. 29, 2015

(54) TRANSIENT AIR FLOW CONTROL

(75) Inventors: John Eric Rollinger, Sterling Heights, MI (US); Freeman Carter Gates, Bloomfield Hills, MI (US); Brien Lloyd Fulton, West Bloomfield, MI (US); Rommel Racelis, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 949 days.

(21) Appl. No.: 13/399,529

(22) Filed: Feb. 17, 2012

(65) Prior Publication Data

US 2013/0213353 A1    Aug. 22, 2013

(51) Int. Cl.
| | |
|---|---|
| *F02D 41/00* | (2006.01) |
| *F02D 21/08* | (2006.01) |
| *F02D 9/02* | (2006.01) |
| *F02D 41/14* | (2006.01) |

(52) U.S. Cl.
CPC ............ *F02D 41/0002* (2013.01); *F02D 21/08* (2013.01); *F02D 41/0052* (2013.01); *F02D 41/0072* (2013.01); *F02D 2009/0276* (2013.01); *F02D 2041/0017* (2013.01); *F02D 2041/1412* (2013.01); *F02D 2041/1431* (2013.01); *F02D 2200/0402* (2013.01); *F02D 2250/28* (2013.01); *F02D 2250/36* (2013.01); *Y02T 10/42* (2013.01); *Y02T 10/47* (2013.01)

(58) Field of Classification Search
CPC ... F02D 41/0052; F02D 41/10; F02D 41/102; F02D 41/105; F02D 41/107; F02D 2041/0017; F02D 2009/0276; F02D 2200/0402; F02D 2250/28; F02D 2250/36; F02D 11/105; F02M 25/0786

USPC ........ 701/108, 110; 123/492, 568.11, 568.21, 123/568.19, 675, 681, 682, 684
See application file for complete search history.

(56) References Cited

U.S. PATENT DOCUMENTS

| | | | | |
|---|---|---|---|---|
| 5,205,260 | A | * | 4/1993 | Takahashi et al. ............ 123/494 |
| 5,273,019 | A | | 12/1993 | Matthews et al. |
| 5,934,249 | A | | 8/1999 | Nanba et al. |
| 6,016,788 | A | * | 1/2000 | Kibe et al. .................... 123/399 |
| 6,876,919 | B2 | * | 4/2005 | James et al. .................. 701/111 |
| 7,016,779 | B2 | | 3/2006 | Bowyer |
| 7,117,078 | B1 | * | 10/2006 | Gangopadhyay ............. 701/103 |
| 7,270,118 | B2 | * | 9/2007 | Yamaoka et al. ............. 123/672 |
| 7,273,046 | B2 | * | 9/2007 | Osumi .......................... 123/681 |
| 7,380,447 | B2 | | 6/2008 | Rollinger et al. |
| 7,437,874 | B2 | * | 10/2008 | Ramamurthy et al. ......... 60/602 |
| 7,533,658 | B2 | * | 5/2009 | Chen ........................ 123/568.19 |
| 7,676,318 | B2 | * | 3/2010 | Allain ........................... 701/103 |
| 7,783,409 | B2 | * | 8/2010 | Kang et al. ................... 701/103 |
| RE42,609 | E | * | 8/2011 | Kurtz et al. .................. 123/492 |
| 8,126,639 | B2 | * | 2/2012 | Roduner et al. .............. 701/108 |
| RE44,452 | E | * | 8/2013 | Stewart et al. ............. 123/198 F |
| 8,538,644 | B2 | * | 9/2013 | Whitney et al. ................. 701/54 |

(Continued)

*Primary Examiner* — Erick Solis
(74) *Attorney, Agent, or Firm* — Julia Voutyras; Alleman Hall McCoy Russell & Tuttle LLP (57) ABSTRACT

Embodiments for controlling cylinder air flow are provided. In one example, a method for controlling airflow into a cylinder of an engine comprises, if a previous cylinder airflow is different than a desired cylinder airflow, allocating flow into an intake manifold between a throttle and an EGR valve to provide the desired cylinder airflow while maintaining a desired EGR amount in the cylinder. In this way, transient air flow requests may be met without delay while maintaining desired cylinder EGR amounts.

20 Claims, 6 Drawing Sheets

(56) References Cited

U.S. PATENT DOCUMENTS

| | | | | |
|---|---|---|---|---|
| 8,655,573 B2 * | 2/2014 | Hokuto | ................ | F02D 41/005 123/399 |
| 8,751,137 B2 * | 6/2014 | Takezoe | ................ | F02D 21/08 123/399 |
| 8,904,787 B2 * | 12/2014 | Styles et al. | ................ | 60/605.2 |
| 8,918,269 B2 * | 12/2014 | Irie | .................... | F02D 41/0062 123/406.44 |
| 2002/0100454 A1 * | 8/2002 | Itoyama et al. | ................ | 123/350 |
| 2005/0114011 A1 * | 5/2005 | Itoyama | ................ | 701/108 |
| 2006/0069494 A1 * | 3/2006 | Yamada et al. | ................ | 701/108 |
| 2007/0175452 A1 * | 8/2007 | Yanakiev et al. | ............ | 123/478 |
| 2008/0127938 A1 * | 6/2008 | Hagari | ................ | 123/439 |
| 2009/0018753 A1 * | 1/2009 | Muller | ................ | 701/103 |
| 2010/0263627 A1 * | 10/2010 | Whitney et al. | ............... | 123/399 |
| 2011/0184632 A1 * | 7/2011 | Kang et al. | ................ | 701/109 |
| 2014/0174413 A1 * | 6/2014 | Huang et al. | ............. | 123/568.18 |

* cited by examiner

TRANSIENT AIR FLOW CONTROL

FIELD

The present disclosure relates to controlling airflow into a cylinder.

BACKGROUND AND SUMMARY

During steady state conditions, airflow into an intake manifold of an engine via a throttle and EGR may be allocated to deliver a desired cylinder airflow amount while maintaining desired EGR in the cylinder. However, during transient conditions, the intake manifold acts as an air buffer and thus the airflow reaching the cylinder may lead or lag desired airflow amounts entering into the manifold. This may result in poor torque response and/or transient EGR disturbances.

U.S. Pat. No. 5,273,019 describes a model for predicting mass air flow into an engine, both with and without EGR, during the same transient condition event. Based on a difference between the models, the percentage of the mass flow that derives from EGR may be determined. While the disclosed models enable determination of EGR concentration during transient events, they do not provide for maintaining a desired cylinder EGR amount, nor do they overcome the delay often associated with achieving a desired cylinder airflow amount during a transient event.

The inventors have recognized the issues with the above approach and offer a method to at least partly address them. In one embodiment, a method for controlling airflow into a cylinder of an engine comprises, if a previous cylinder airflow is different than a desired cylinder airflow, allocating flow into an intake manifold between a throttle and an EGR valve to provide the desired cylinder airflow while maintaining a desired EGR amount in the cylinder.

In this way, both the throttle and EGR valve may be controlled using transient airflow compensation to achieve rapid filling or unfilling of an intake manifold. Further, by allocating the flow between the throttle and the EGR valve, a desired EGR amount in the cylinder may be maintained. In one example, the desired cylinder airflow may be a prediction based on the previous cylinder airflow, a manifold filling model, and a driver torque request. The manifold filling model may determine a compensation airflow amount entering the manifold that rapidly drives the airflow leaving the manifold from the previous cylinder airflow amount to the desired cylinder airflow amount. This compensation airflow amount may be allocated between the throttle and the EGR valve to provide the desired cylinder airflow while maintaining a desired cylinder EGR amount.

The present disclosure may provide several advantages. First, transient conditions frequently result in torque fluctuations that can be unsatisfactory to a vehicle operator. By rapidly responding to a requested torque change, the present disclosure may improve vehicle response and operator satisfaction. Further, EGR disturbances during transient conditions may degrade combustion events, leading to reduced fuel economy and increased emissions. By maintaining desired EGR amounts even during transient events, fuel economy and emissions may be improved.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

During a change in cylinder flow from an intake manifold, for example in response to a pedal tip-in event, airflow disturbances may result due to the delay associated with the filling or unfilling of the manifold. Thus, during transient conditions, delivered cylinder airflow may not match desired or commanded airflow. Closed-loop feedback control using sensors in the engine, such as manifold pressure and/or mass air flow sensors, may alleviate some of the issues in delivering desired cylinder flow during transient conditions, but sensor feedback is also associated with a response delay.

By using a manifold filling model that predicts a change in a cylinder flow amount based on a previous cylinder flow amount and a constant volumetric efficiency state of the manifold, accurate determination of desired cylinder flow may be provided without reliance on sensors. Further, because the model may predict a manifold inflow amount that drives the previous cylinder flow to the desired cylinder flow without delay, transient disturbances may be reduced. This manifold inflow amount may be allocated between a throttle and EGR valve dependent on a desired cylinder EGR amount such that desired cylinder EGR amounts are maintained even during transient opening or closing of the throttle.

Figure 1:
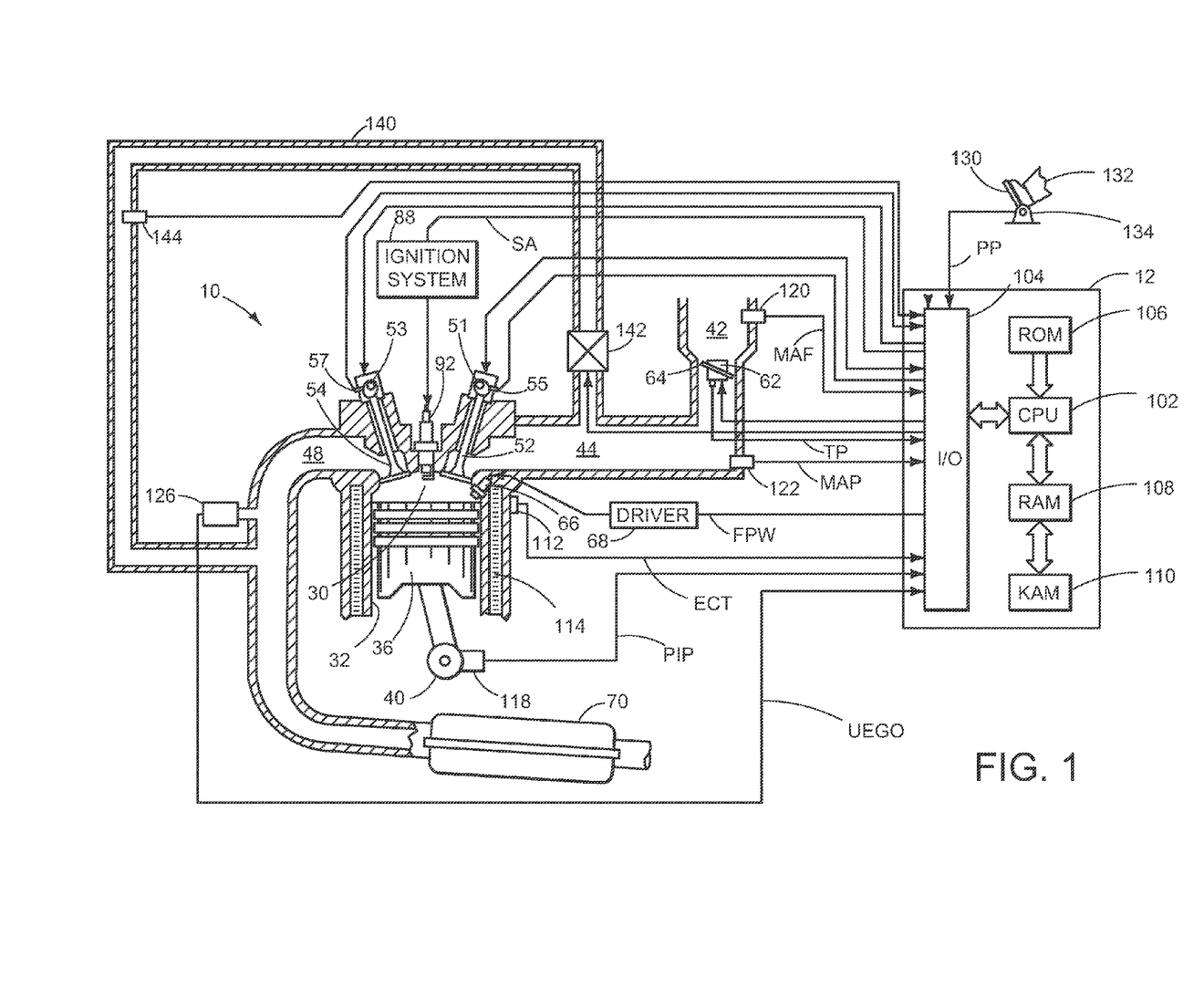
FIG. 1 shows a schematic diagram of a combustion chamber of an internal combustion engine.

FIG. 1 is a schematic diagram showing one cylinder of multi-cylinder engine 10, which may be included in a propulsion system of a vehicle. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 42 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Further, in the disclosed embodiments, an exhaust gas recirculation (EGR) system may route a desired portion of exhaust gas from exhaust passage 48 to intake manifold 44 via EGR passage 140. The amount of EGR provided to intake manifold 44 may be varied by controller 12 via EGR valve 142. Further, an EGR sensor 144 may be arranged within the EGR passage and may provide an indication of one or more pressure, temperature, and concentration of the exhaust gas. In some examples, sensor 144 is a differential pressure transducer detecting pressure drop across a flow control orifice placed either upstream or downstream of the EGR valve which will also provide an indication of the amount of EGR. Sensor 144 also may also be a position sensor which can detect EGR valve flow area changes based upon commands from controller 12. Further, during some conditions, a portion of combustion gases may be retained or trapped in the combustion chamber by controlling exhaust valve timing, such as by controlling a variable valve timing mechanism.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below in FIGS. 2-4 as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

Figure 2:
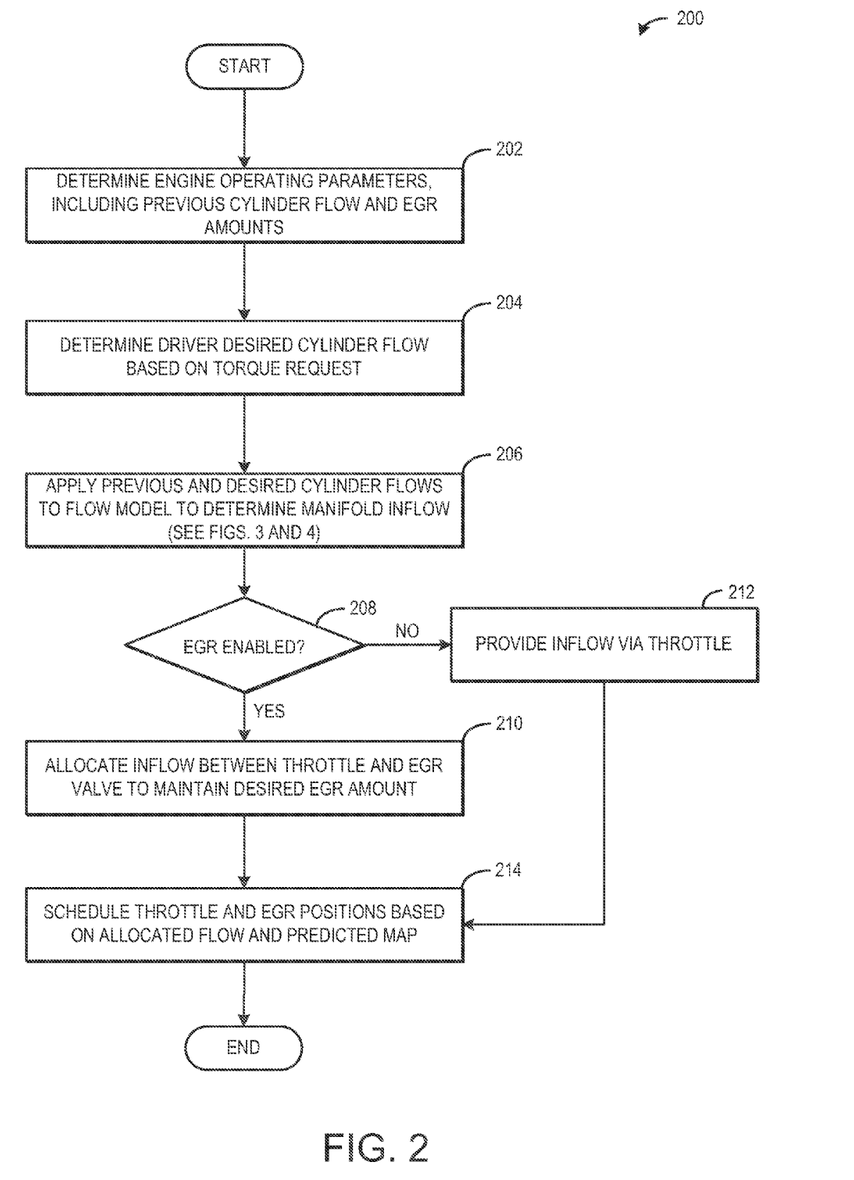
FIG. 2 shows a flow chart illustrating a method for controlling flow into an intake manifold.

FIG. 2 illustrates a method 200 for controlling flow into an intake manifold of an engine. Method 200 may be carried out by instructions stored in the memory of a controller, such as controller 12. Method 200 includes, at 202, determining engine operating parameters including a desired cylinder EGR amount and a previous cylinder air flow amount. The operating parameters may also include engine speed and load, barometric pressure, MAP and MAF, engine and/or manifold temperature, driver requested torque, etc. The previous cylinder air flow amount may refer to a previously calculated cylinder air flow amount at the most recent previous sample in the context of a digital control system carrying out iterative determinations via algorithms at discrete sample/calculation events.

At 204, a desired driver cylinder air flow is determined based on a driver torque request. Thus, the desired cylinder air flow may be a change in the cylinder air flow due to a torque request.

At 206, method 200 includes applying the previous and desired cylinder air flows to a model, such as the manifold filling model, to determine a manifold inflow amount. The previous cylinder air flow amount may be determined based on a manifold filling model, as described in more detail with respect to FIGS. 3 and 4 below, or may be determined based on sensor signals from a MAP sensor, MAF sensor, etc. The model may use the previous and desired cylinder flow amounts to determine a manifold inflow amount that drives the previous cylinder air flow to the desired cylinder air flow without a delay. Additional detail regarding the model will be described below with respect to FIGS. 3 and 4. At 208, it is determined if EGR is enabled. If EGR is enabled, at 210, the manifold inflow amount determined from the model may be allocated between the throttle and EGR valve to maintain the desired cylinder EGR amount. In this way, the manifold inflow amount indicated from the model that will result in the desired cylinder flow may be provided via flow from the throttle, EGR valve, or both. The relative portion of the inflow that derives from the throttle flow and from the EGR flow may be determined by the desired cylinder EGR amount such that the desired cylinder flow may be provided while maintaining the desired cylinder EGR amount. If EGR is not enabled, method 200 proceeds to 212 to provide the inflow amount via the throttle only.

Both 210 and 212 proceed to 214 where the throttle and/or EGR valve positions are scheduled based on the allocated flow and MAP, which may be predicted based on a model (described in FIG. 4) or may be determined based on a MAP sensor. The positions of the throttle and EGR valve may be determined using a standard orifice flow equation. After providing the inflow to the manifold, method 200 ends.

Figure 3:
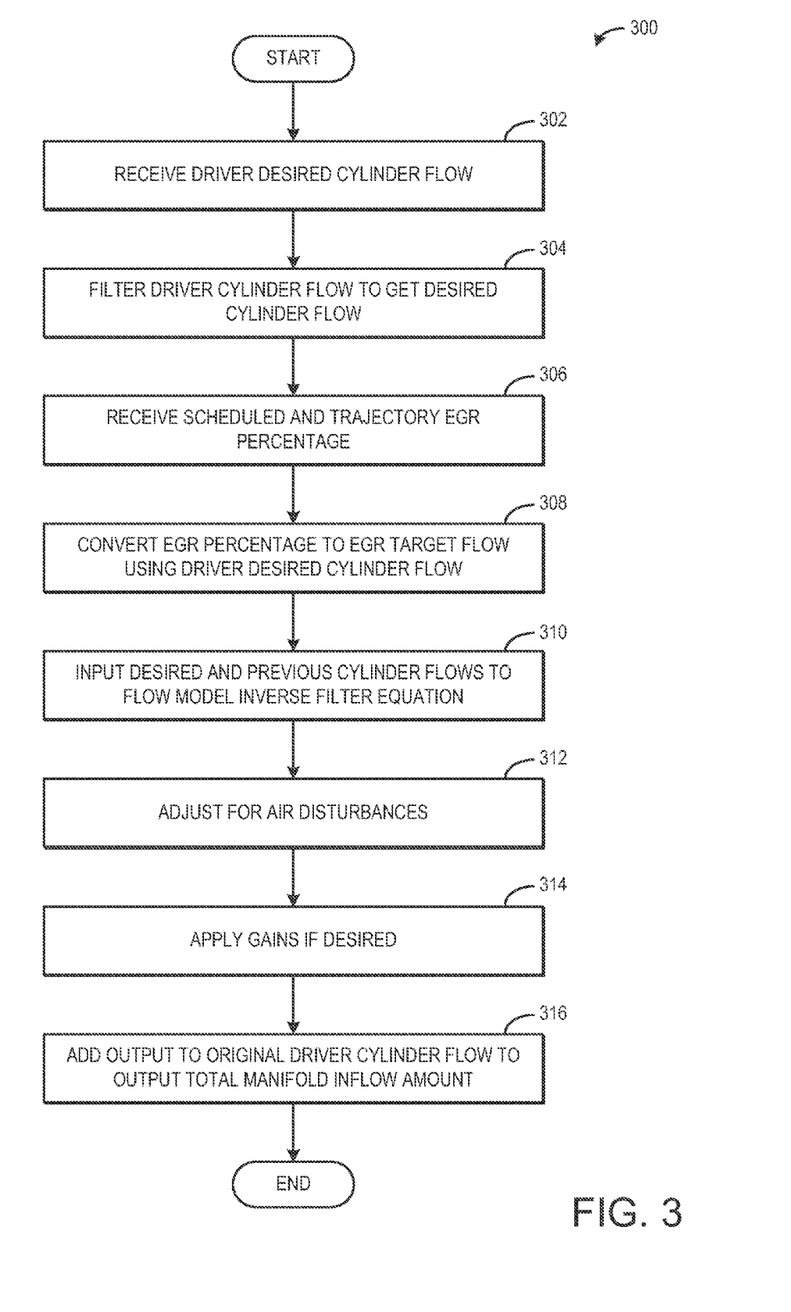
FIG. 3 shows a flow chart illustrating a method for determining a manifold inflow amount using a manifold filling flow model.

FIG. 3 illustrates a method 300 for determining a manifold inflow amount using a manifold filling flow model. Method 300 may be carried out by instructions stored in the memory of the controller 12, and may be carried out in response to a transient cylinder air flow change. In the embodiment illustrated in FIG. 3, the flow model is based on a filter equation, such as a Kahlman filter, which outputs a manifold inflow amount based on a previous cylinder air flow and a desired cylinder air flow. The model initially assumes a constant physical state of the manifold, such that volume, temperature, etc. of the manifold remains constant and thus the change in cylinder flow may be attributed to only the change in inflow to the manifold. Additional details of the model will be presented below with respect to FIG. 4.

At 302, method 300 includes receiving a driver desired cylinder flow request, such as the driver cylinder flow of FIG. 2. At 304, the driver desired flow may be filtered to determine an overall desired cylinder flow. In some embodiments, the driver desired flow and the overall desired cylinder flow may be equal. However, in some examples, the driver desired flow may be adjusted, or filtered, to provide a slower transition to the requested cylinder flow, for example, or based on engine operating parameters, to improve vehicle response and operator satisfaction.

At 306, method 300 includes receiving a scheduled and trajectory EGR percentage. The scheduled and future EGR percentage may be based on operating conditions including speed, load, combustion stability, etc. At 308, based on the scheduled EGR percentage and the overall desired cylinder air flow, the EGR percentage is converted to a target EGR flow for use in allocating the flow between the throttle and the EGR valve, as explained with regard to FIG. 2. Further, the desired cylinder air flow and target EGR flow may used to update the model and predict certain operating parameters, as described with respect to FIG. 4.

At 310, the desired and previous cylinder air flows are input into an inverse flow model filter equation. As explained above with respect to FIG. 2, the previous cylinder air flow may be determined from a previous calculation of the model (explained with respect to FIG. 4), or if that is unavailable, based on MAP and MAF input. The additional manifold inflow amount ($I_{(x)}$) for driving the desired cylinder airflow ($CF_{(x)}$) from the previous cylinder air flow ($CF_{(x-1)}$) may be determined using a current filter constant ($Fk_{(x)}$) and previously determined filter constant ($Fk_{(x-1)}$) according to the equation:

$$I_{(x)} = \left[\frac{(1-Fk_{(x)})}{Fk_{(x)}}(CF_{(x)})\right] - \left[\frac{(1-Fk_{(x)})}{Fk_{(x-1)}}(CF_{(x-1)})\right]$$

The filter constant (Fk) may be a manifold filling lag constant based on current operating conditions, and will be described in more detail with respect to FIG. 4. In this example, x represents the current sample instance. The model assumes the filter constant does not change, that is that the manifold maintains constant volumetric efficiency. However, in some embodiments, the inflow amount may be altered due to one or more air flow disturbances in the engine. These disturbances may alter the volume, temperature, etc., of the manifold, and may include a change in position of a charge motion control valve in the intake, or a change in exhaust backpressure due to a shift in a turbocharger wastegate or due to a change in intake and/or exhaust valve timing, etc. Thus, at 312, method 300 includes adjusting the inflow amount for one or more air disturbances. These disturbances may be modeled based on throttle inlet pressure (TIP), throttle outlet pressure (TOP), and MAP at current and previous engine settings, and will be explained in more detail below with respect to FIG. 4. Further, at 314, one or more gains may be applied to the inflow amount, if desired. For example, the inflow amount to reach the desired cylinder air flow may produce a sudden torque change that would be noticeable to an operator. Thus, a gain may be applied to "soften" the change in airflow. In another example, the inflow amount may have a gain applied to it under high speed conditions but not under low speed conditions, or based on other operating parameters. At 316, the total manifold inflow amount needed to produce the desired cylinder air flow is output from the model, and then method 300 ends.

While not depicted in FIG. 3, the model may be updated with the inflow output in order to maintain accuracy of the model and predict certain operating parameters, such as MAP. Thus, the flow model may include a prediction model. FIG. 4 is a flow chart illustrating a method 400 for updating a prediction model, which outputs predicted/previous values that may be input into the flow model of FIG. 3. Method 400 may be carried out according to instructions stored in the memory of controller 12.

At 402, method 400 includes determining prediction model filter parameters. As explained previously, the flow model manifold filling model includes a filter constant (Fk). The filter constant may be a state transition model constant, and as applied herein may be the manifold filling lag based on current conditions. The filter constant may be based on the ideal gas law, and may include a volume of the intake manifold, a throttle pressure across the throttle, an EGR pressure across the EGR valve, an intake air mass, an EGR mass, and engine temperature. As such, determining the model filter parameters may include determining the temperature and the volume of the manifold at 404, and the mass and the partial pressures of the intake air through the throttle and the EGR through the EGR valve at 406. The partial pressures and mass of the intake and EGR may be determined from sensor output and/or from parameters from previous model estimates (as described below). The manifold temperature may be estimated based on ambient temperature and engine temperature, or from a temperature sensor.

At 408, the throttle flow and EGR valve flow are received. The throttle flow and EGR valve flow may be the flows output from the flow model, as described with respect to FIG. 2. At 410, the throttle flow is converted to a throttle angle (TA) and the EGR valve flow is converted to an EGR valve position. The TA and EGR valve position may be based on the received throttle and EGR flows, as well as barometric pressure, predicted MAP from the last output of the model (described below), and/or pressure in the EGR passage. At 412, the TA and EGR valve position are filtered, similar to the filtering that was described with respect to FIG. 3. The filtered TA and EGR valve position are then input into two separate branches of the model, a non-delay branch and a delayed branch.

At 414, the TA and EGR valve position are each converted to a no delay throttle flow and no delay EGR flow. The no delay throttle and EGR flows are then input into a manifold filling model for no delay flow at 416. This includes receiving an output of the previous cylinder flow (CF) at 418, which may be input as the previous cylinder flow ($CF_{(x-1)}$) value into the flow model of FIG. 3. The previous cylinder flow value may be determined based on the total manifold inflow (MF) as input from the no delay throttle and EGR flows using the equation:

$$CF = \left[(1 - Fk_{(x)})\left(\frac{Fk_{(x)}}{Fk_{(x-1)}}\right)(CF_{(x-1)}) + Fk_{(x)}(MF)\right]$$

Upon outputting the previous cylinder no delay flow at 418, method 400 returns.

The second branch of the prediction model includes converting the filtered TA and EGR valve positions from 412 to a delay throttle flow and delay EGR valve flow at 420. The delay in the flow may be added in order to predict a current cylinder flow value that accounts for the delay in filling the manifold. At 422, the delayed throttle and EGR flows are input into a manifold fill model for the current flow. This includes receiving an output that is the prediction of the current cylinder flow at 423, and may be determined using the filter equation described above.

At 424, the predicted current cylinder flow output at 423 may be used to calculate MAP, TIP, and TOP at both current and previous device settings. The device settings may include any changes to engine operating parameters that cause a disturbance in the air flow in the manifold, such as a change in charge motion control valve position, change in exhaust backpressure, sudden change in engine speed, change in camshaft position, etc. These may be estimated based on operating parameters including engine speed, cam position, charge motion control valve position, barometric pressure, EGR flow, charge temperature, manifold volume, exhaust backpressure, etc.

At 426, a difference between the previous and current MAP may be determined to calculate the air disturbance to the model. In some embodiments, this may include dividing the difference in MAP by (RT/V) and a change in time ($\Delta t$), wherein R is the ideal gas constant, T is the temperature of the manifold, and V is the volume of the manifold. This produces an air amount to the manifold inlet that is needed to cancel out any changes to the manifold flow caused by the air disturbances. One or more gains may be applied to the disturbances, to tune the model, and the disturbances may be output to the flow model of FIG. 3 at 428. Upon outputting the disturbances to the flow model, method 400 returns.

Figure 4:
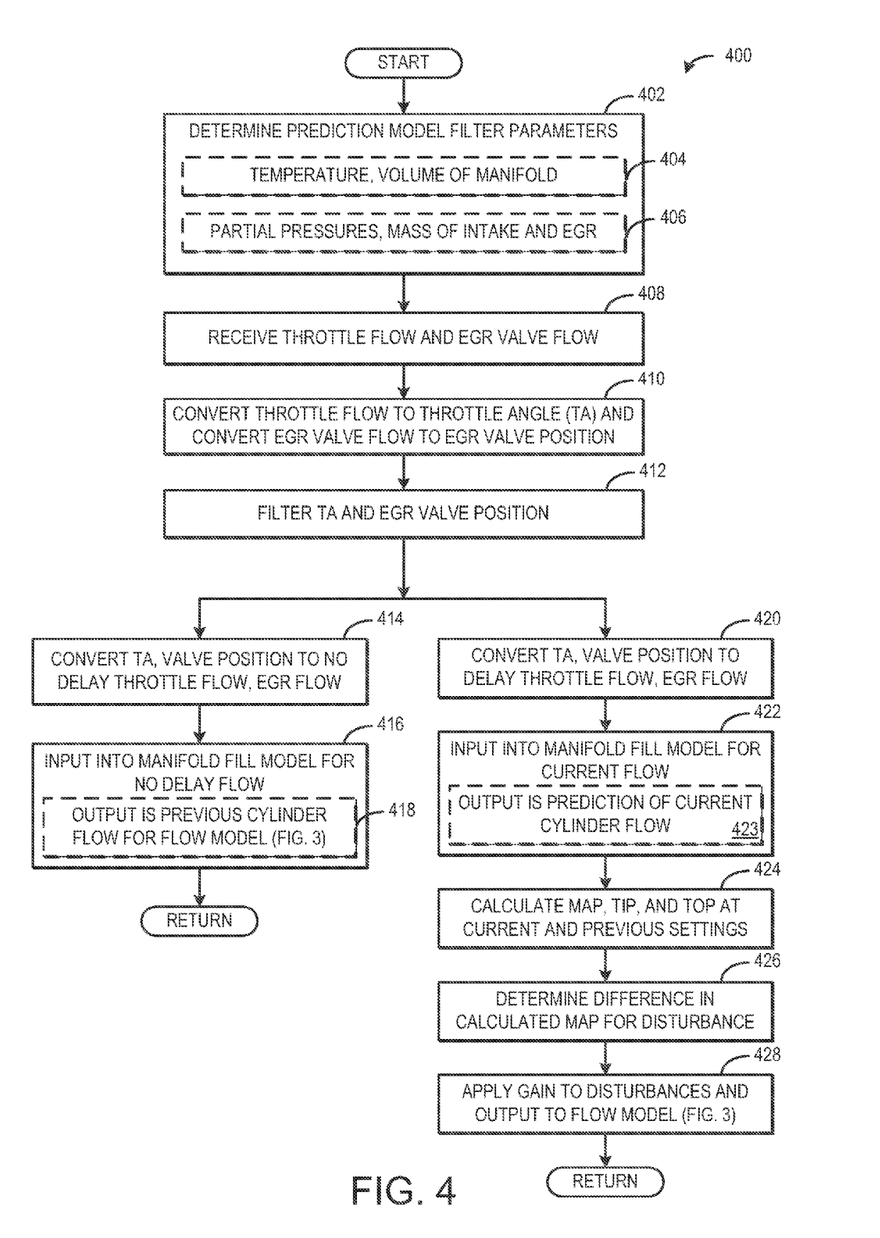
FIG. 4 shows a flow chart illustrating a method for determining a cylinder flow amount using a manifold filling prediction model.

Thus, method 400 of FIG. 4 provides for a prediction arm of the flow model that determines MAP, TOP, TIP and a previous cylinder flow estimate without using sensor input. These outputs may be used to calculate the total manifold inflow amount to drive the previous cylinder flow to the desired cylinder without delay, as described with respect to FIGS. 2 and 3.

Figure 5:
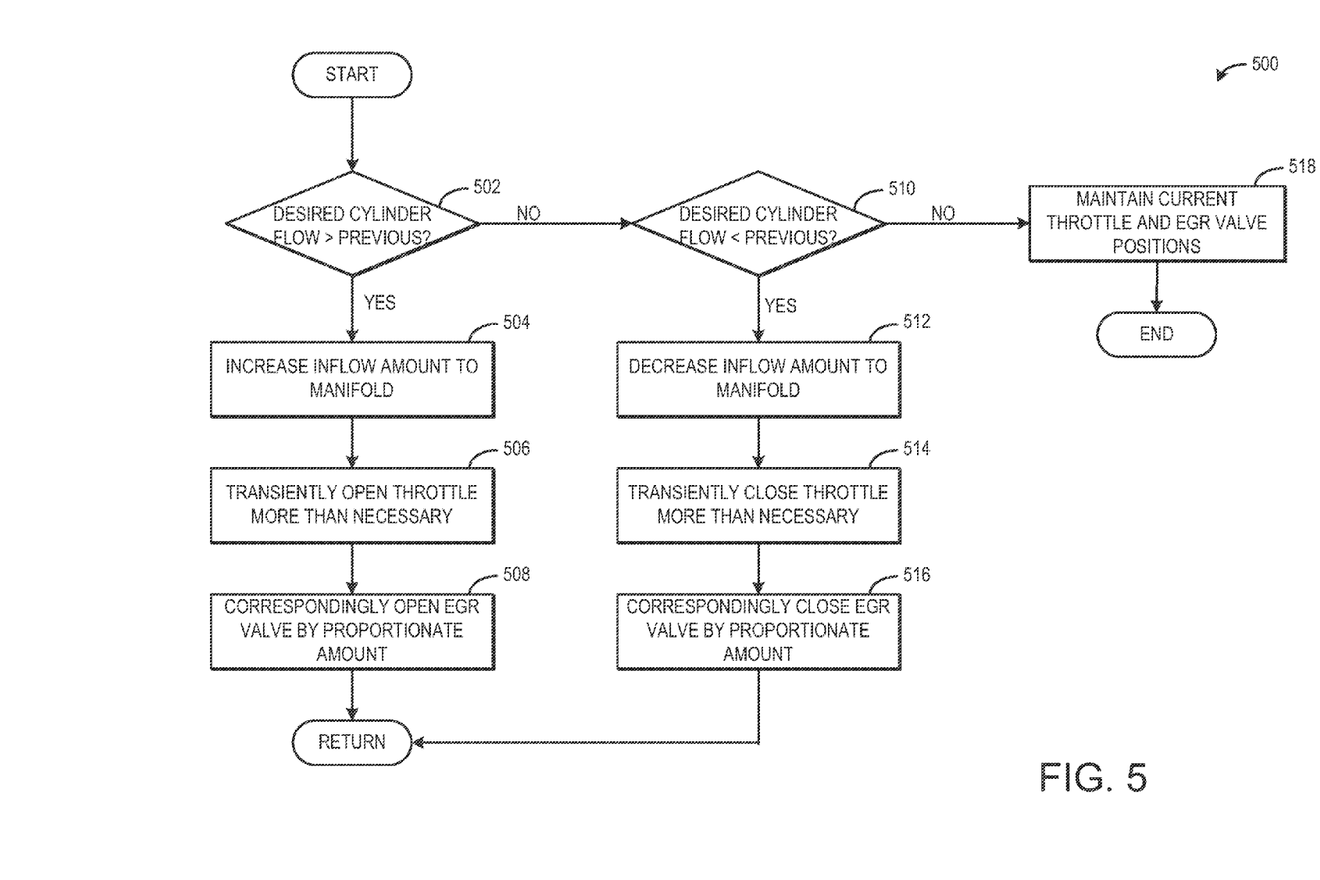
FIG. 5 shows a flow chart illustrating a method for adjusting a throttle and EGR valve in response to an air flow request.

FIG. 5 illustrates a method 500 for adjusting a throttle and/or EGR valve in response to a cylinder air flow request. Method 500 may be carried out according to instructions stored in the memory of the controller 12. Method 500 may be carried out using the manifold inflow amount determined from method 300 of FIG. 3, during the execution of method 200 of FIG. 2, in order to allocate the inflow between the throttle and EGR.

Method 500 comprises, at 502, determining if a desired cylinder air flow amount is greater than a previous cylinder air flow amount. If yes, method 500 proceeds to 504 to increase the inflow amount to the manifold. At 506, the throttle is transiently opened more than necessary to deliver at least a part of the increased inflow to the manifold. The term "more than necessary" is meant to indicate an opening amount that is more than would be opened to provide the desired cylinder flow if the engine were in steady state operating conditions. That is, the throttle is opened by a larger amount during a response to a transient increase in cylinder air than the throttle is opened during steady state, even if the amount of air delivered to the cylinder is the same in both circumstances. In some embodiments, if EGR is not enabled, the throttle is opened to provide all the inflow.

If EGR is enabled, at 508 method 500 includes correspondingly opening the EGR valve by a proportionate amount to the throttle opening. Thus, the EGR valve is also opened more than necessary in order to track the air flow through the throttle and maintain a desired cylinder EGR amount. The EGR valve may not be opened the same amount as the throttle, but may be opened to a similar degree. The setting of the EGR valve may further be based on the desired cylinder EGR amount.

Returning to 502, if the desired cylinder flow is not greater than the previous, method 500 proceeds to 510 to determine if the desired cylinder flow is less than the previous cylinder flow. If yes, method 500 proceeds to 512 decrease the inflow amount to the manifold. At 514, the throttle is transiently closed more than necessary, and at 516, if EGR is enabled, the EGR valve is correspondingly closed by an amount proportionate to the throttle. Upon either opening or closing the EGR valve at 508 or 516, method 500 returns to continue to adjust the throttle and EGR valves based on desired and previous cylinder air flow.

Returning to 510, if it is determined that the desired cylinder air flow is not less than the previous air flow, then the desired air flow is equal to the previous air flow. As such, method 500 proceeds to 518 to maintain current throttle and EGR valve positions, and then method 500 ends.

Thus, the methods provided in FIGS. 2-5 provide for determining an inflow amount to an intake manifold based on a manifold filling model. The manifold filling model may be based on the ideal gas law, adapted to include intake air and EGR in the manifold. The manifold filling model may use a previous cylinder air flow amount and a desired cylinder air flow amount to predict the inflow into the manifold to drive the previous cylinder flow to the desired cylinder flow without a delay. The inflow may be allocated between the throttle and EGR valve to maintain a desired cylinder EGR amount.

Figure 6:
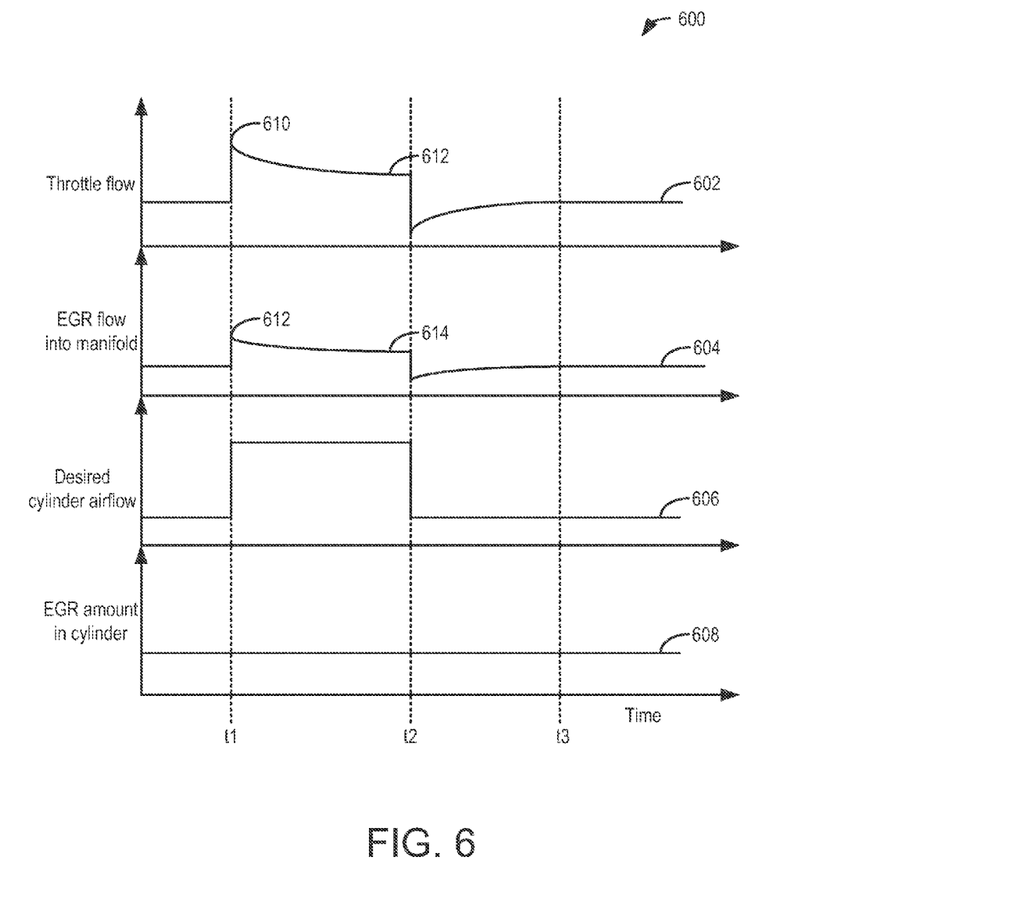
FIG. 6 shows a map illustrating example throttle and EGR valve adjustments during engine operation.

Now turning to FIG. 6, map 600 shows an example adjustment of throttle and EGR flow to provide a desired cylinder air flow. By adjusting the throttle flow in coordination with EGR flow, a desired cylinder air flow may be provided while maintaining a desired EGR amount in the cylinder. Map 600 depicts changes in throttle flow at graph 602, changes in an EGR flow at 604, changes in cylinder air flow at 606, and changes in cylinder EGR amount at 608.

Before t1, based on engine operating conditions (such as, an engine speed and load condition), a desired cylinder air flow and cylinder EGR percentage may be determined. Based on the desired cylinder air flow and EGR amount, an EGR flow and a throttle flow may be determined. In one example, at t1, a sudden increase in cylinder air flow may be requested. The increase in cylinder air flow may be requested, for example, during a pedal tip-in. Accordingly, at t1, an amount of throttle flow may be increased. Additionally, a corresponding amount of EGR flow may be increased. The EGR flow may be increased (graph 604) by the actuation of the EGR valve in the EGR passage. However, there may be a delay from the time the throttle and EGR valve are actuated and the time that the increased throttle and EGR flow are achieved and received at the cylinder. Specifically, the delay in mixing of EGR gases with intake air to achieve the desired EGR amount/flow and the arriving of the mixed EGR flow at the cylinder may lead to EGR transients that may transiently degrade engine efficiency. Herein, to compensate, the throttle may be transiently opened more than necessary, and the EGR valve may correspondingly be opened proportionate to the throttle to maintain the desired EGR amount in the cylinder. As explained previously, by transiently opening the throttle "more than necessary" it is meant that the throttle is opened more during the initial response to the cylinder air flow request than the amount the throttle would be opened to provide a similar desired cylinder flow amount during steady state conditions. For example, the throttle is transiently opened by a first amount to produce a first throttle flow 610. However, the throttle then begins to close until a second throttle flow 612 is achieved. The second throttle flow 612 is the throttle flow utilized to produce the desired cylinder air flow under steady state conditions. Similar to the throttle flow, the EGR flow may have a first EGR flow 614 that is proportionate to the first throttle flow 610, and may also decrease until the second EGR flow 616 is reached. By adjusting and coordinating the throttle flow and the EGR flow, the desired cylinder air flow may be immediately provided.

At t2, in response to a decrease in requested cylinder air flow, EGR flow and throttle flow may be decreased. In one example, the decrease in EGR flow and throttle flow may be requested during a pedal tip-out. Herein, during the decrease in EGR flow, throttle flow may also be immediately decreased (to allow an immediate drop in cylinder airflow) after which the throttle flow amount may be gradually increased. Thus, the desired cylinder air flow may be rapidly achieved while maintaining the desired EGR amount in the cylinder. At t3, the throttle flow and EGR flow are maintained to provide the desired cylinder air flow during steady state conditions.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling air flow into a cylinder of an engine, comprising:
   if a previous cylinder air flow is different than a desired cylinder air flow, adjusting flow into an intake manifold between a throttle and an EGR valve to provide the desired cylinder air flow while maintaining a constant desired EGR amount in the cylinder, and where the desired cylinder air flow is adjusted via the previous cylinder air flow and a filter constant divided by a previous filter constant.

2. The method of claim 1, wherein the previous cylinder air flow is determined during constant volumetric efficiency of the intake manifold, and where adjusting flow into the intake manifold between the throttle and the EGR valve includes opening the throttle more than the throttle would be open during steady state engine conditions for a same desired cylinder air flow.

3. The method of claim 2, wherein the previous cylinder air flow is determined based on an intake manifold filling model, and where the desired EGR amount in the cylinder is constant, where the desired cylinder air flow is based on a cylinder air flow, and where the cylinder air flow is based on the filter constant divided by the previous filter constant.

4. The method of claim 3, wherein the intake manifold filling model is based on a volume of the intake manifold, a throttle pressure across the throttle, an EGR pressure across the EGR valve, an intake air mass, an EGR mass, and engine temperature.

5. The method of claim 1, wherein adjusting air flow into the intake manifold further comprises adjusting air flow in the intake manifold based on air flow disturbances.

6. The method of claim 5, wherein the air flow disturbances comprise one or more of a change in camshaft position, change in exhaust backpressure, and change in a position of a charge motion control valve.

7. An engine method, comprising:
   during an increase from a first desired steady state engine air flow to a second desired steady state engine air flow, transiently opening a throttle to a first position more than necessary to provide a desired cylinder air flow while adjusting an EGR valve to maintain a constant cylinder EGR amount even while transiently opening the throttle; and closing the throttle from the first position to a second position less open than the first position to provide the second desired steady state engine air flow.

8. The method of claim 7, further comprising, during steady state conditions, predicting cylinder air flow amounts based on manifold inflow amounts, and further comprising during an increase from the first desired steady state engine air flow to the second desired steady state engine air flow, opening the EGR valve to a third position and closing the EGR valve to a fourth position less open than the third position.

9. The method of claim 8, wherein transiently opening the throttle and adjusting the EGR valve further comprise opening the throttle and EGR valve to admit a manifold inflow amount that produces the desired cylinder air flow, and where engine air flow is transitioned from the first desired steady state engine air flow to the second desired steady state engine air flow via the desired cylinder air flow, and where the desired cylinder air flow is adjusted via a previous cylinder air flow and a filter constant divided by a previous filter constant.

10. The method of claim 9, wherein predicting cylinder air flow amounts based on manifold inflow amounts further comprises predicting cylinder air flow amounts based on a volume of an intake manifold, a throttle pressure across the throttle, an EGR pressure across the EGR valve, an intake air mass, an EGR mass, and engine temperature, and where the desired cylinder air flow is based on a cylinder air flow, and where the cylinder air flow is based on the filter constant divided by the previous filter constant.

11. The method of claim 7, wherein adjusting the EGR valve includes opening the EGR valve more than necessary during the transient opening of the throttle.

12. The method of claim 7, wherein adjusting the EGR valve includes opening the EGR valve corresponding to the transient opening of the throttle.

13. The method of claim 7, wherein transiently opening the throttle includes opening the throttle by an amount corresponding to the adjusting of the EGR valve.

14. The method of claim 7, further comprising during a decrease in desired cylinder air flow, transiently closing the throttle more than necessary to provide the desired cylinder air flow while adjusting the EGR valve to maintain the constant cylinder EGR amount even while transiently closing the throttle.

15. A method, comprising:
predicting a desired cylinder air flow based on a previous cylinder air flow and a torque request, and where the desired cylinder air flow is adjusted via the previous cylinder air flow and a filter constant divided by a previous filter constant;
if the desired cylinder air flow is greater than the previous cylinder air flow, increasing air flow to an intake manifold coupled to the cylinder from a first amount to a second amount; and
adjusting the air flow into the intake manifold between a throttle and an EGR valve to the second amount and maintain a constant desired EGR percentage in air flow out of the intake manifold via opening the throttle to a first position and closing the throttle to a second position.

16. The method of claim 15, wherein increasing air flow to the intake manifold further comprises determining an air compensation amount based on the desired cylinder air flow and previous cylinder air flow, and opening the throttle and EGR valve to admit the desired cylinder air flow and the air compensation amount.

17. The method of claim 15, wherein adjusting the air flow between the throttle and the EGR valve further comprises transiently opening the throttle and EGR valve more than necessary to provide the desired cylinder air flow, where the desired cylinder air flow is based on a cylinder air flow, and where the cylinder air flow is based on the filter constant divided by the previous filter constant.

18. The method of claim 15, further comprising if the desired cylinder air flow is less than the previous cylinder air flow, reducing air flow to the intake manifold.

19. The method of claim 18, wherein reducing air flow to the intake manifold further comprises transiently closing the throttle and EGR valve more than necessary to provide the desired cylinder air flow.

20. The method of claim 15, wherein the desired cylinder air flow is further predicted based on a volume of the intake manifold, a throttle pressure across the throttle, an EGR pressure across the EGR valve, an intake air mass, an EGR mass, and engine temperature.

* * * * *